United States Patent
Chretien et al.

(10) Patent No.: US 9,537,442 B2
(45) Date of Patent: Jan. 3, 2017

(54) METHODS AND SYSTEMS FOR CONTROLLING POWER TO AN ELECTRIC MOTOR

(71) Applicant: Regal Beloit America, Inc., Beloit, WI (US)

(72) Inventors: Ludovic Andre Chretien, Columbia City, IN (US); Roger Carlos Becerra, Fort Wayne, IN (US); Steven W. Post, Cassville, MO (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 912 days.

(21) Appl. No.: 13/804,718

(22) Filed: Mar. 14, 2013

(65) Prior Publication Data

US 2014/0260410 A1    Sep. 18, 2014

(51) Int. Cl.
  *H02P 29/00* (2016.01)
  *H02P 27/08* (2006.01)
  *H02J 1/10* (2006.01)

(52) U.S. Cl.
  CPC .............. *H02P 27/08* (2013.01); *H02J 1/102* (2013.01)

(58) Field of Classification Search
  CPC .. F25B 27/00; F25B 2400/14; F25B 2400/141
  See application file for complete search history.

(56) References Cited

U.S. PATENT DOCUMENTS

| | | | |
|---|---|---|---|
| 3,408,046 A | 10/1968 | Wollenweber, Jr. et al. | |
| 3,934,424 A | 1/1976 | Goldsberry | |
| 5,142,468 A | 8/1992 | Nerem | |
| 5,467,613 A | 11/1995 | Brasz | |
| 5,819,554 A | 10/1998 | Glen | |
| 6,272,871 B1 | 8/2001 | Eisenhour | |
| 6,304,006 B1 | 10/2001 | Jungreis | |
| 6,543,238 B2 | 4/2003 | Yamanaka et al. | |
| 8,769,983 B2 | 7/2014 | Okazaki | |
| 8,776,539 B2 | 7/2014 | Verma et al. | |
| 2003/0221434 A1* | 12/2003 | Neiter | F25B 9/06 62/116 |
| 2008/0141705 A1 | 6/2008 | Eisenhour | |
| 2011/0018348 A1 | 1/2011 | Rockenfeller et al. | |
| 2012/0067055 A1* | 3/2012 | Held | F02C 7/12 60/772 |
| 2012/0187764 A1 | 7/2012 | Rockenfeller et al. | |
| 2013/0041516 A1 | 2/2013 | Rockenfeller et al. | |
| 2013/0181453 A1 | 7/2013 | Post et al. | |

FOREIGN PATENT DOCUMENTS

WO    2006/066347 A1    6/2006

* cited by examiner

Primary Examiner — Cassey D Bauer
(74) Attorney, Agent, or Firm — Thompson Coburn LLP; Alan Norman

(57) ABSTRACT

Methods and systems for controlling an electric motor are provided herein. The system is configured to be coupled to a power supply. The electric motor system includes a rectifier, an electric motor, and a microcontroller. The rectifier is configured to convert an alternating current (AC) voltage input to a direct current (DC) voltage. The microcontroller is configured to extract power from a generator device.

4 Claims, 7 Drawing Sheets

METHODS AND SYSTEMS FOR CONTROLLING POWER TO AN ELECTRIC MOTOR

BACKGROUND

The embodiments described herein relate generally to motors, and more particularly, to methods and systems for controlling power delivered to an electric motor.

Electric motors are used in a variety of systems operating in a variety of industries. Electric motors are used to power products such as fans used in heating, ventilation and air conditioning systems (HVAC). Energy losses occur during a thermodynamic cycle of refrigerant in a heating, ventilation, and air conditioning (HVAC) system. Some of the dissipated energy may be recovered or regenerated using a low power turbine-generator assembly. Typically, energy is regenerated back to an electrical grid. Regeneration to the grid requires extra components, which can make it impractical and inefficient to regenerate energy to the grid. Moreover, known systems that regenerate energy rely on the regeneration source to "compete" with a conventional power supply to provide energy to the electric motor. That is, the regeneration source can only provide power to the electric motor when its terminal voltage is greater than the terminal voltage of the conventional power supply. Accordingly, until the amount of generated voltage reaches and exceeds the amount of power being supplied by the power supply, the regenerated energy is not used. Such known systems result in wasted energy and lack of control of supplying power to the electric motor.

BRIEF DESCRIPTION

In one aspect, a system configured to be coupled to a power supply is provided. The electric motor system includes a rectifier, an electric motor, and a microcontroller. The rectifier is configured to convert an alternating current (AC) voltage input to a direct current (DC) voltage. The microcontroller is configured to extract power from a generator device.

In another aspect, a method of controlling power to an electric motor powered by a power supply is provided. The method includes coupling a capacitor between a rectifier and an electric motor. The capacitor is configured to smooth a DC voltage rectified by the rectifier. The method also includes coupling a generator device across the capacitor using an inverter, extracting power from the generator device, and powering the electric motor at least in part using the extracted power.

In a further aspect, a heating, ventilation, and air conditioning (HVAC) system is provided. The HVAC system includes a compressor including a first electric motor, a condenser including a second electric motor, a blower motor, a turbine-generator expansion valve coupled to an output of said compressor, and a controller. The turbine-generator expansion valve is configured to convert mechanical energy generated during refrigerant expansion of the HVAC system to electrical energy. The controller is configured to extract the electrical energy from the expansion valve and apply the electrical energy to at least partially power at least one of the compressor motor, the condenser motor, and the blower motor.

DETAILED DESCRIPTION

Figure 1:
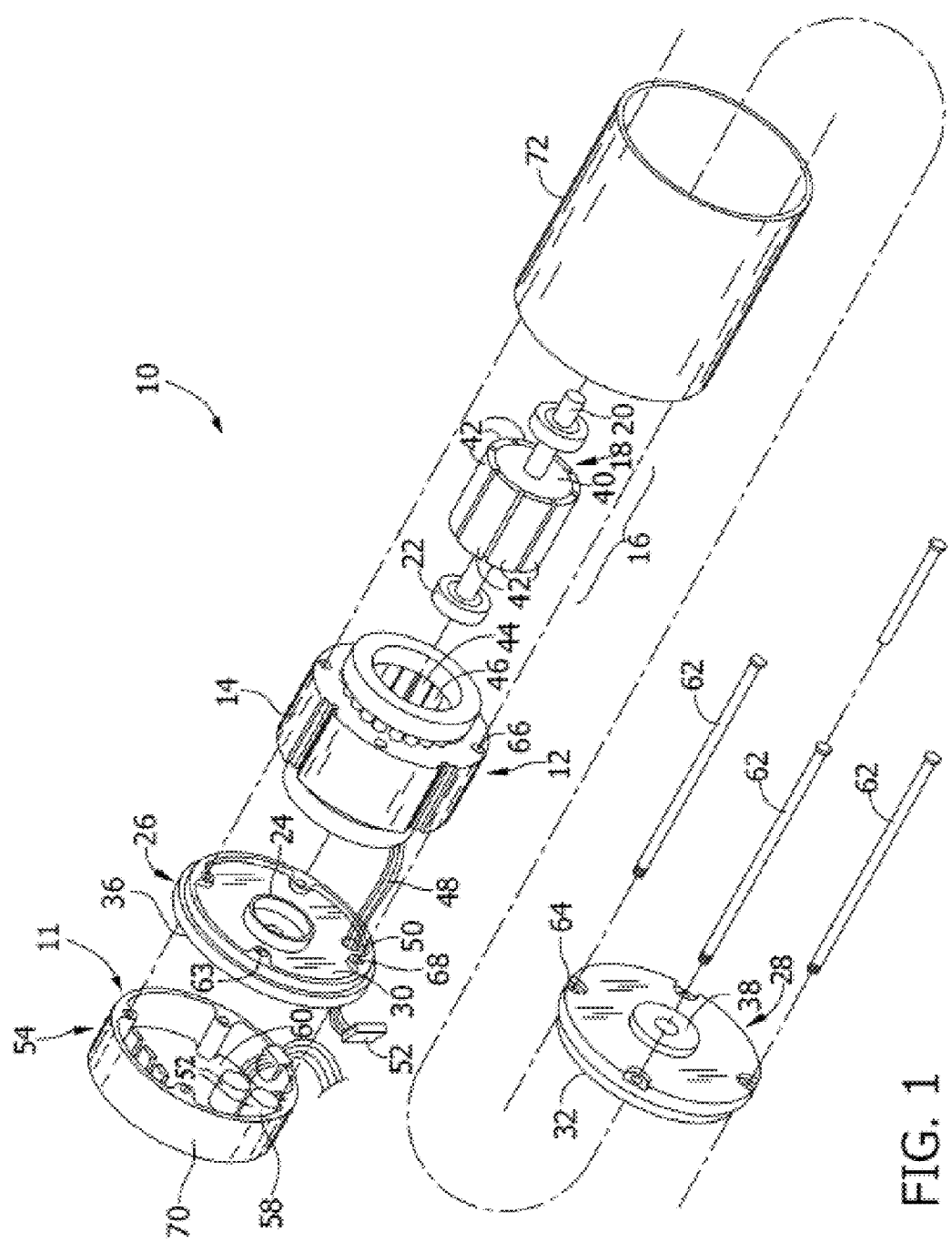
FIG. 1 is an exploded view of an exemplary motor.
Figure 2:
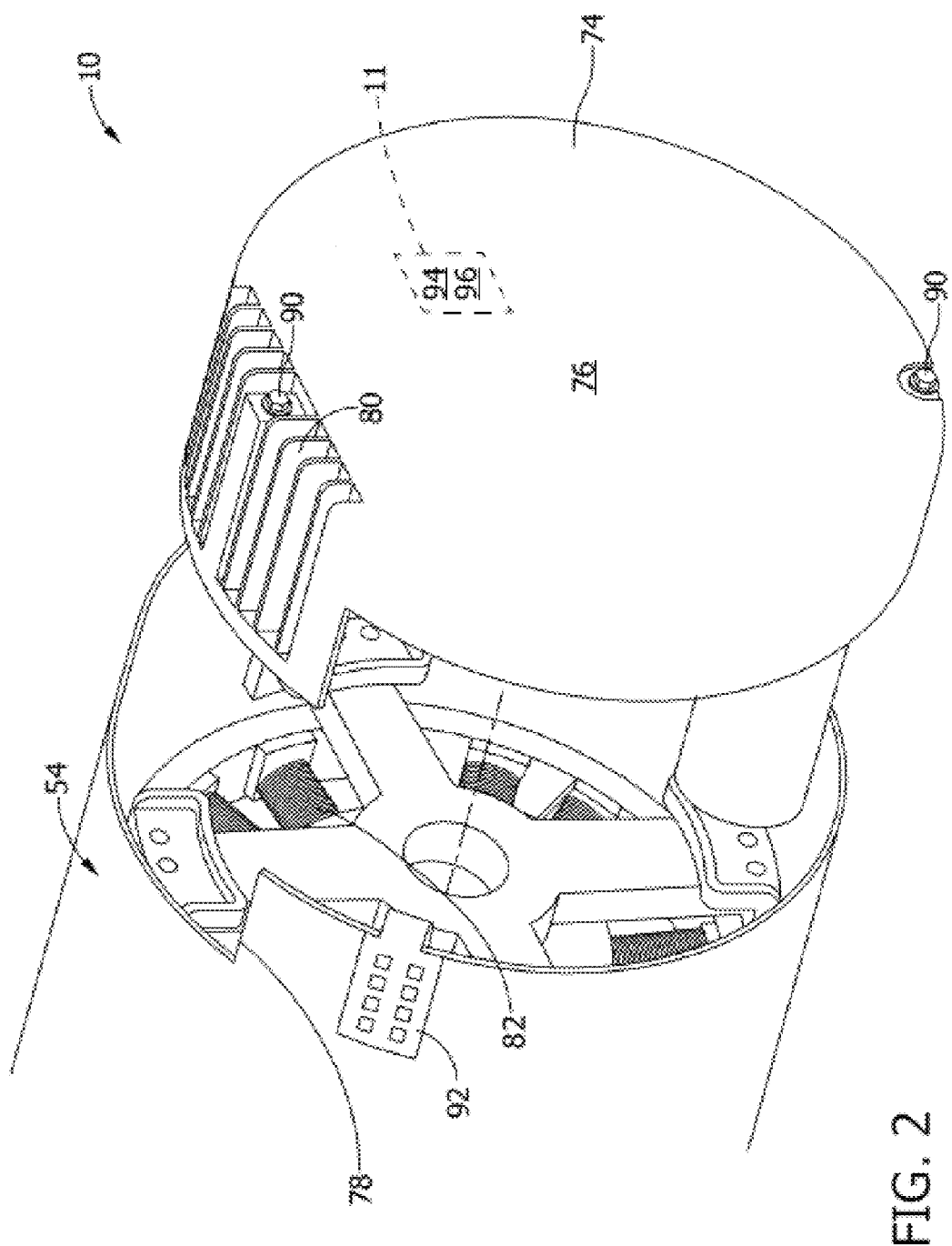
FIG. 2 is an exploded partial view of the motor of FIG. 1 having an exemplary embodiment control system coupled to the motor for use in controlling operation of the motor.

FIG. 1 is an exploded view of an exemplary motor 10. FIG. 2 is an exploded partial view of motor 10 having an exemplary control system 11 coupled to motor 10. Motor 10 includes a stationary assembly 12 including a stator or core 14 and a rotatable assembly 16 including a permanent magnet rotor 18 and a shaft 20. In the exemplary embodiment, motor 10 is used in a heating, ventilating and air conditioning system (not shown).

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 further includes an enclosure 54 which mounts on a rear portion of motor 10. Control system 11 includes a plurality of electronic components 58 and a connector (not shown) mounted on a component board 60, such as a printed circuit board. Control system 11 is connected to winding stages 44 by interconnecting connector 52. Control system 11 applies a voltage to one or more of winding stages 44 at a time for commutating winding stages 44 in a preselected sequence to rotate rotatable assembly 16 about an axis of rotation.

Connecting elements 62 include a plurality of bolts that pass through bolt holes 64 in second end member 28, bolt holes 66 in core 14, bolt holes 68 in first end member 26, and bolt holes 70 in enclosure 44. Connecting elements 62 are adapted to urge second end member 28 and enclosure 44 toward each other thereby supporting first end member 26, stationary assembly 12, and rotatable assembly 16 therebetween. Additionally, a housing 72 is positioned between first end member 26 and second end member 28 to facilitate enclosing and protecting stationary assembly 12 and rotatable assembly 16.

Motor 10 may include any even number of rotor poles and the number of stator poles may be a multiple of the number of rotor poles. For example, the number of stator poles may be based on the number of phases. In one embodiment (not shown), a three-phase motor 10 includes six rotor pole pairs and stator poles.

FIG. 2 is an exploded end view of an embodiment of motor 10. A chassis 74 of enclosure 54 provides an end shield 76 for motor 10. Motor enclosure 54 also includes a slot 78 which engages a heat sink 80 formed in chassis 74. Motor 10 is configured such that motor enclosure 54 covers control system 11 (schematically shown in FIG. 2). Within motor enclosure 54 are windings 82 of motor 10.

In one embodiment, fasteners 90 pass through end shield 76 to secure control system 11 within motor enclosure 54. This alignment and symmetry remain even when chassis 74 containing the electronics of control system 11 is removed. Retaining the alignment and symmetry within enclosure 54 is important as it lowers a replacement cost of control system 11 in the field. Additionally, such a configuration allows for placement of a power connector 92 flush with enclosure 54.

In the exemplary embodiment, motor 10 includes a brushless DC motor. Alternatively, motor 10 may include other motors such as, but not limited to, brushless AC motors and switched reluctance motors. In one embodiment, motor 10 includes a brushless DC motor having a known classification of a "56 Frame 3 Hp" motor, which is a three-phase motor. Motor 10 includes a voltage rating 94 which is determined by the motor manufacturer and which is stored in control system 11.

Figure 3:
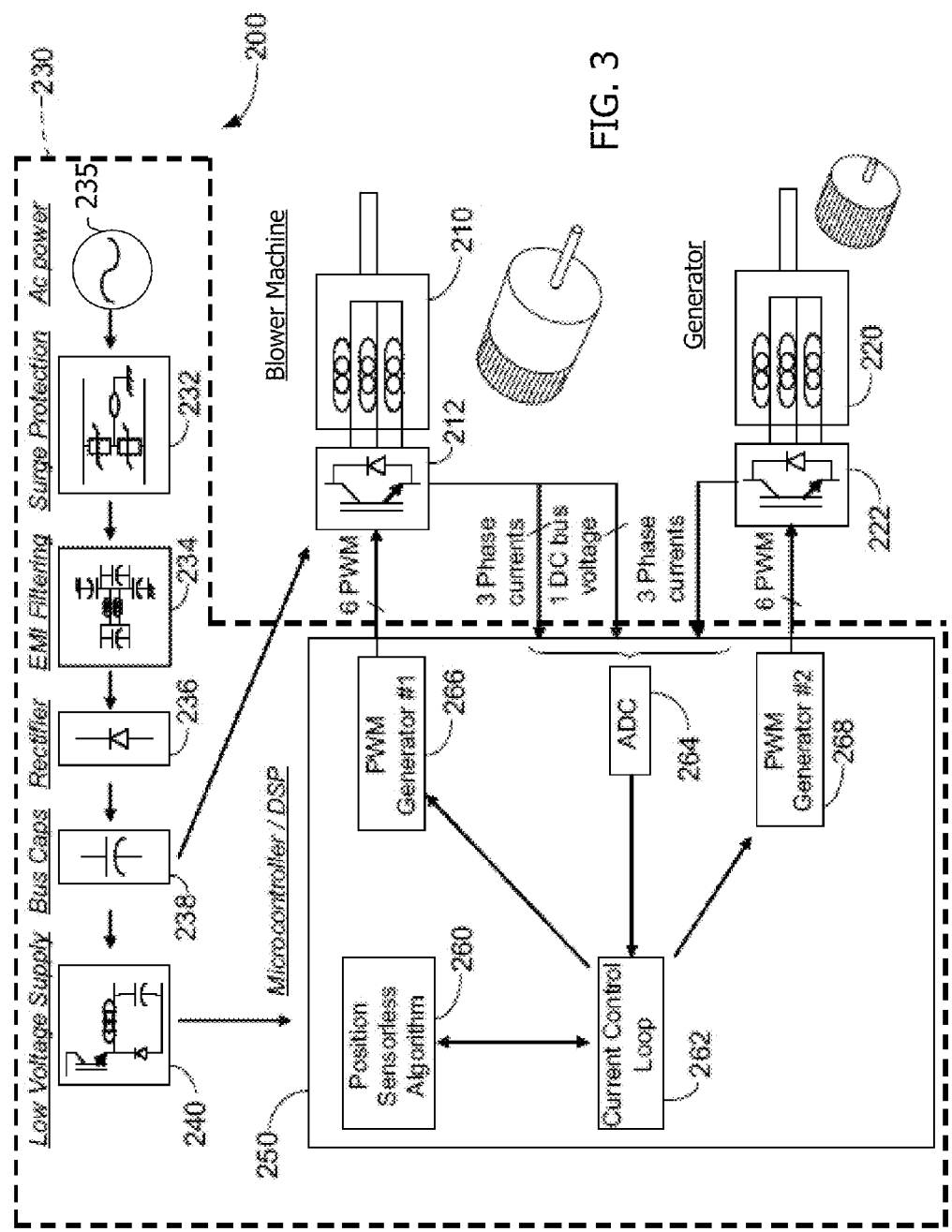
FIG. 3 is a functional diagram of a motor system 200 for a furnace, or similar, application.
Figure 4:
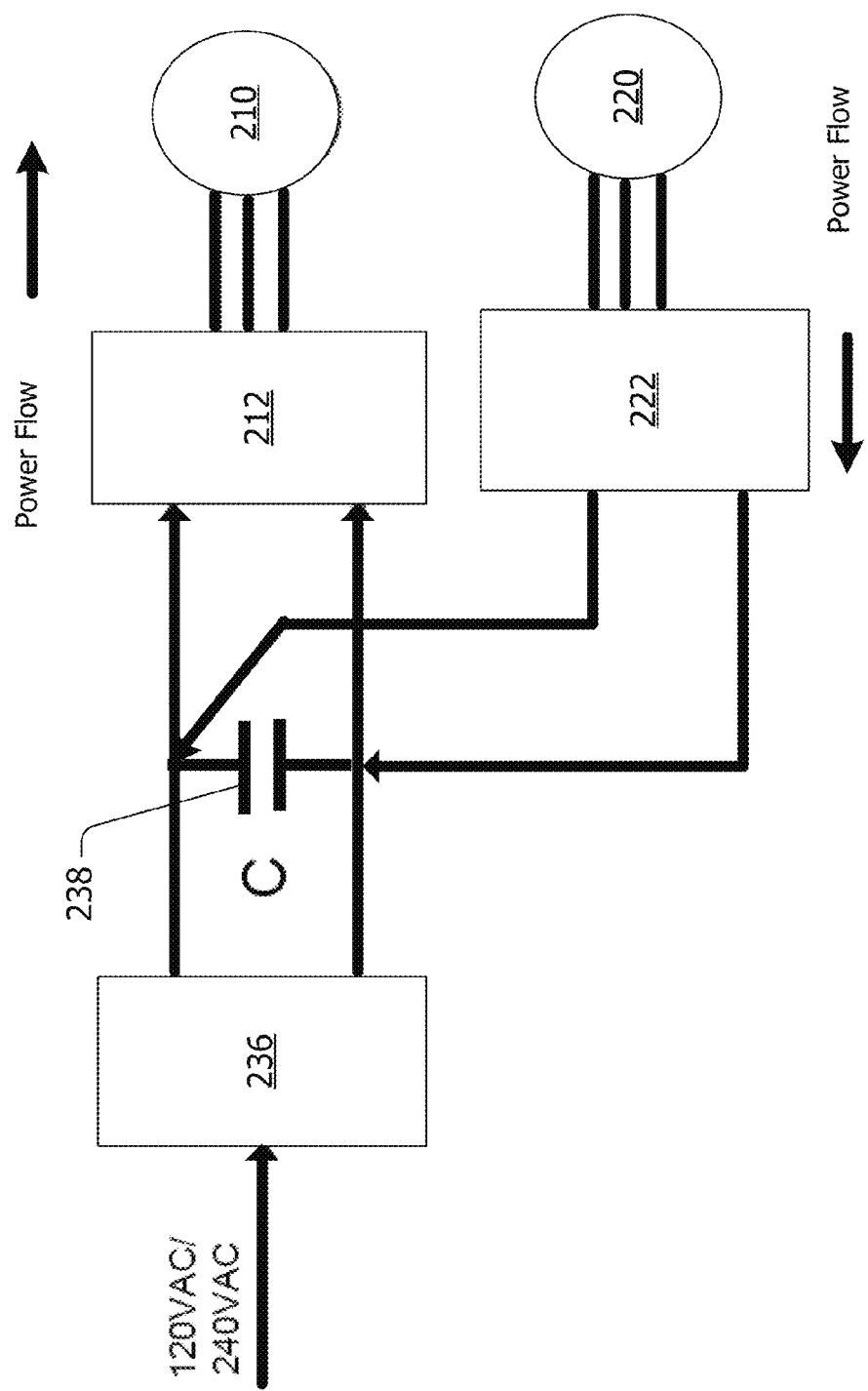
FIG. 4 is a schematic diagram of motor system.

FIG. 3 is a functional diagram of a motor system 200 for a furnace, or similar, application. FIG. 4 is a schematic diagram of motor system 200. Motor system 200 includes an electric motor 210, a first inverter 212, a generator device 220, and a second inverter 222, and a motor controller 230. Motor controller 230 includes a surge protection device 232 and electromagnetic interference filter 234 for filtering in AC power. In the exemplary embodiment, power supply 235 is configured to provide a 120 $V_{AC}$ to 240 $V_{AC}$ input. However, power supply may provide any amount of input that enables motor system to function as described herein.

The signals output from electromagnetic interference filtering 234 are applied to a rectifier 236 and a capacitor 238 to generate a smoothed DC voltage which is applied to a low voltage supply 240 and inverter 212. An output of the low voltage supply 240 is utilized at least for supplying power to a dual processing unit 250, which may sometimes be referred to as a microcontroller/DSP 250. Programmed to control operation of both electric motor 210 and generator device 220 of motor system 200, processing unit 250 may include circuits operable to perform a positioning algorithm 260, current control 262, analog to digital conversion 264, first pulse-width modulated (PWM) signal generation 266 specific to electric motor 210, and second PWM signal generation 268 specific to generator device 220.

First PWM signal generator 266 generates the PWM signals that are utilized to induce rotation of electric motor 210, via first inverter 212 at varying speeds according to parameters of the PWM signals received. Signals received from electric motor 210 are received at processing unit 250 and include signals relating to the current drawn by at least one phase of electric motor 210, as well as a DC link voltage across capacitor 238. Within processing unit 250, switching is provided such that the ADC 264 is capable of providing current data to current control loop 262 for electric motor 210 and generator device 220. Second PWM signal generator 268 controls generator device 220 via second inverter 222. Processing unit 250 monitors speed and/or phase voltage and extracts energy from generator device 220 when available.

Referring now to FIG. 4, in the exemplary embodiment, generator device 220 is coupled across capacitor 238 and is configured to supplement power supply 235 in providing power to electric motor 210. Generator device 220 may include a variety of different devices, as described in further detail herein. DC voltage from generator device 220 is stored in capacitor 238. Because the voltage is stored in capacitor 238, it used to directly to power electric motor 210 and does not have to be reconditioned for regeneration back to a power line. Additionally, capacitor 238 is already present in a typical electric motor, so no new components need to be added. Regenerating power back to the line requires costly additional components and results in some loss of regenerated power during transmission to the line. Using the regenerated power to directly power electric motor 210 results in higher efficiency of operation and a reduction in cost of necessary components. Using a single controller to control both operation of electric motor 210 and generation device 220 enables additional redundant components to be removed, resulting in an additional reduction in cost of components. Generator device 220 may store energy in capacitor 238 even if electric motor 210 is not being operated. Motor system 200 is not limited to using one processing unit 250 for controlling both electric motor 210 and generator device 220, as described herein. In an alternative embodiment, motor system 200 may have separate processing units 250 for controlling each of electric motor 210 and generator device 220.

Figure 5:
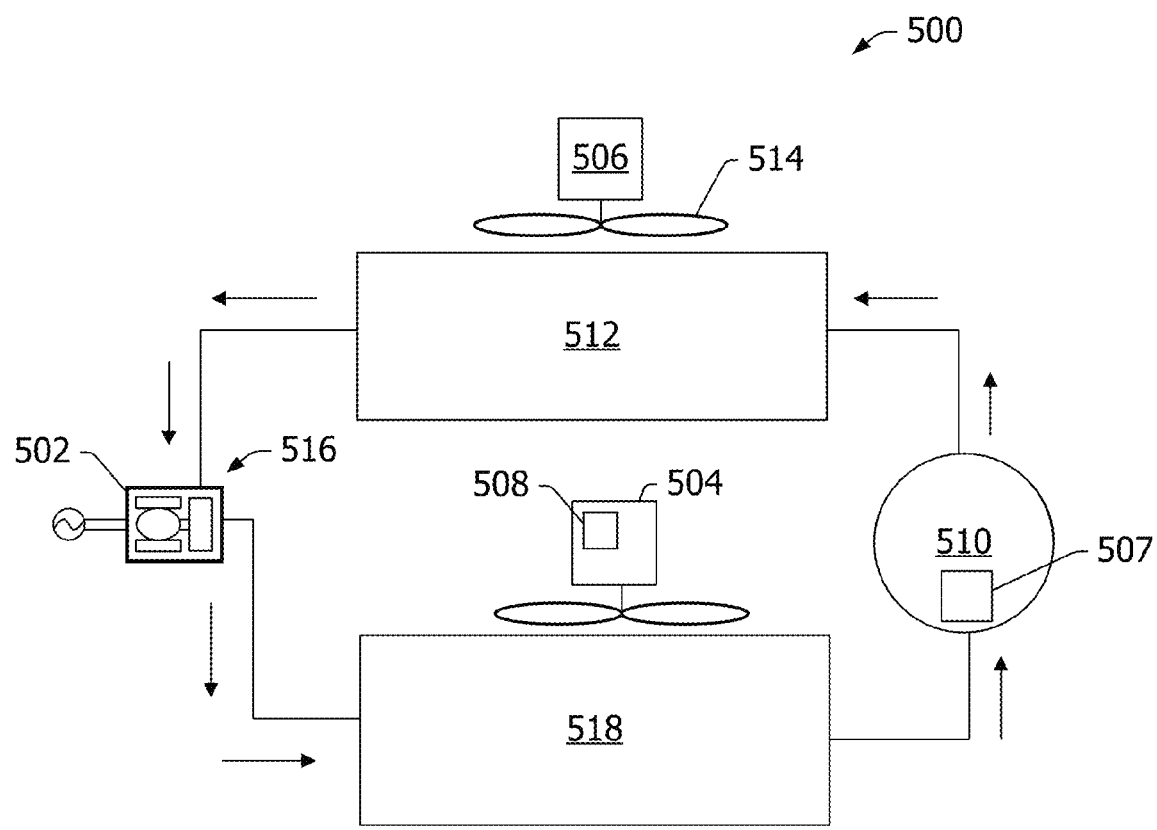
FIG. 5 illustrates a functional diagram of an exemplary air conditioning unit such as a portion of a residential heating, ventilation, and air-conditioning (HVAC) including a generator device that may be used with the motor system shown in FIG. 3.

FIG. 5 illustrates a functional diagram of an exemplary air conditioning unit 500 such as a portion of a residential heating, ventilation, and air-conditioning (HVAC) including a generator device 502 that may be used with motor system 200 (shown in FIG. 3). In the exemplary embodiment, generator device 502 is a low power turbine generator assembly for harvesting energy dissipated during a thermodynamic cycle of refrigerant in air conditioning unit 500.

Air conditioning unit 500 typically includes three electric motors, for example, a blower motor 504 and a condenser motor 506 and a compressor motor 507. Blower motor 504 incorporates a controller 508 physically located thereon that is also operable for controlling operation of condenser motor 506 and/or compressor motor 507.

Compressor motor 507 compresses a refrigerant using a compressor 510, causing the temperature of the refrigerant to rise. The hot refrigerant gas is provided to a condenser coil 512. Condenser motor 506 (also referred to as a fan motor) turns an impeller 514 to circulate air across the condenser coil 512, reducing the temperature of condenser coil 512 and the refrigerant within condenser coil 512. The liquid refrigerant then flows through a turbine-generator expansion valve 516 where the refrigerant is lowered in pressure. Finally, the refrigerant passes through an evaporator 518. As the liquid refrigerant evaporates it absorbs energy (heat) from the inside air, returns to compressor 510, and repeats the cycle. In the process heat is absorbed from indoors and transferred outdoors, resulting in cooling of the building. Turbine-generator expansion valve 516 is configured to recover excess energy dissipated by unit 500. The energy is used to turn a shaft of generator device 502, which generates electrical energy to be provided to motor system 200.

In the exemplary embodiment, electric motor 210 (shown in FIG. 3) may include blower motor 504, condenser motor 506, and/or compressor motor 507. Additionally, motor controller 230 (shown in FIG. 3) may include controller 508. Processing unit 250 (shown in FIG. 3) monitors generator speed and phase voltage and extracts energy from generator device 502 when available. More specifically, to obtain energy from generator device 502, processing unit 250 extracts currents stored in the windings of generator device 502 using inverter 222 (shown in FIG. 3), and utilizes the generated power for operation of blower motor 504, condenser motor 506, and/or compressor motor 507. Generator device 502 may be either a single-phase or a three-phase generator. Inverter 222 uses one or more switches to condition energy from generator 604 for storage in capacitor 238.

If generator device 502 is rotating at any speed, there is a back electromotive force (EMF) being generated. Even if the rotational speed of generator device 502 is low, causing the back EMF voltage to be low, energy can still be stored in capacitor 238. Additionally, energy can still be stored in capacitor 238 when electric motor 210 is not operating. Storing the regenerated energy in capacitor 238 facilitates electric motor 210 to use less energy from a power supply, resulting in increased overall system efficiency.

Figure 6:
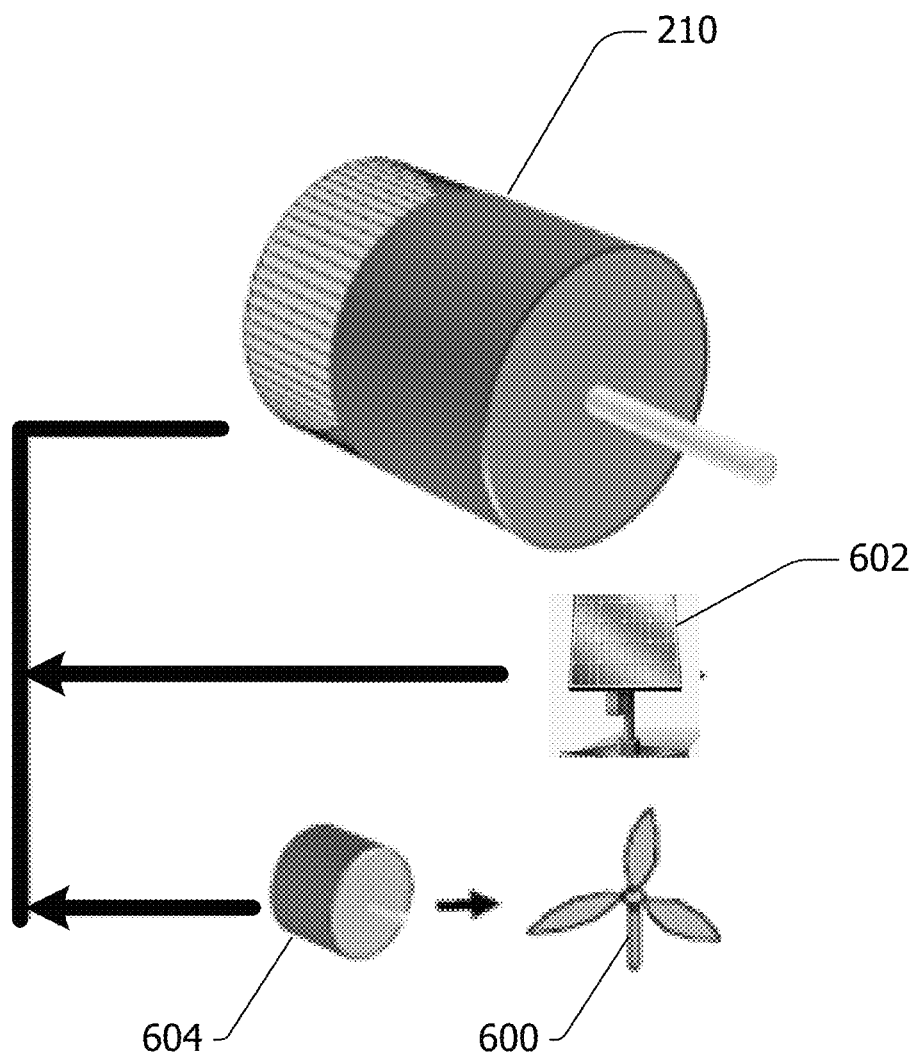
FIG. 6 illustrates an alternative embodiment of the generator device shown in FIG. 2.

FIG. 6 illustrates an alternate embodiment of generator device 220 (shown in FIG. 2). In the exemplary embodiment, generator device 220 is a renewable energy source, for example, a wind turbine 600 or a solar panel array 602.

In the exemplary embodiment, wind turbine 600 uses harvested wind energy to drive a shaft (not shown) of a generator 604 coupled to wind turbine 600. Processing unit 250 (shown in FIG. 3) monitors generator speed and phase voltage and extracts energy from generator 604 when available. More specifically, to obtain energy from generator 604, processing unit 250 takes winding currents of generator 604 using inverter 222 (shown in FIG. 3), and utilizes the generated power for operation of electric motor 210. Generator 604 may be either a single-phase or a three-phase generator. Inverter 222 uses one or more switches to condition energy from generator 604 for storage in capacitor 238.

Solar panel array 602 generates a single-phase DC voltage. As an amount of light impinging solar panel array 602 increases or decreases, the amount of energy output by solar panel array 602 increases or decreases, respectively. Inverter 222 conditions the energy by acting as a DC-DC converter to step up the voltage from solar panel array 602 to motor controller 230.

Figure 7:
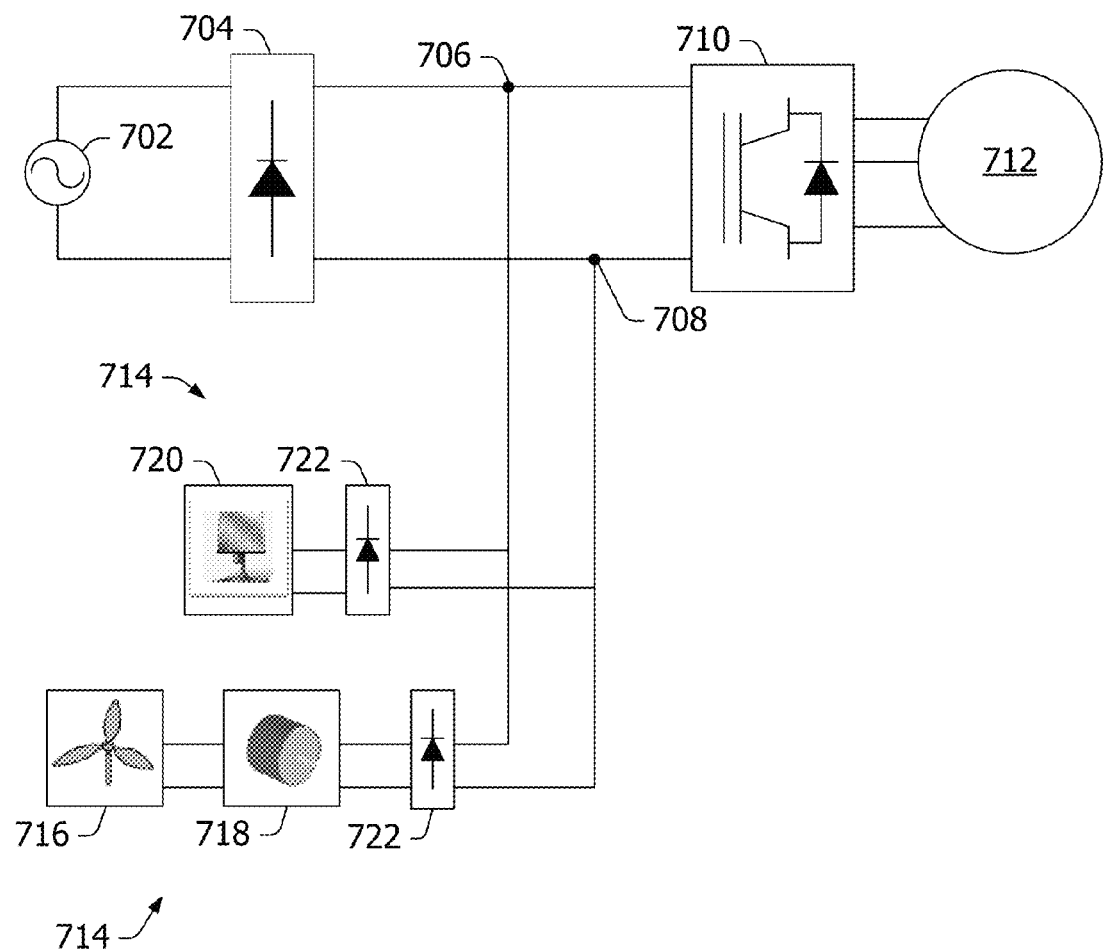
FIG. 7 illustrates an alternative embodiment of the motor system shown in FIG. 2.

FIG. 7 illustrates an alternative embodiment 700 of motor system 200 shown in FIG. 2. In the exemplary embodiment, AC voltage from an AC power supply 702 is rectified using a bridge rectifier 704. The rectified AC voltage output, namely nodes 706 and 708, is coupled to an inverter 710. Inverter 710 conditions the rectified voltage to a voltage usable by an electric motor 712. In the exemplary embodiment, electric motor 712 is configured to utilize a DC voltage (i.e., the rectified AC voltage) for operation. In the exemplary embodiment, power supply 702 is configured to provide a $120 V_{AC}$ or $240 V_{AC}$ input. However, power supply may provide any amount of input that enables motor system to function as described herein.

In the exemplary embodiment, electric motor system 700 also includes a renewable energy power source, for example, generator device 714, an output of which is electrically coupled to nodes 706 and 708. In one embodiment, generator device 714 is a wind turbine 716 coupled to a generator 718. In another embodiment, generator device 714 is a solar panel array 720. A rectifier 722 is coupled in series with generator device 714 to condition the voltage into voltage usable by electric motor 712.

System 700 cannot control the amount of energy extracted from generator device 714 because voltage from generator device 714 is rectified and coupled directly to the DC link of motor system 700. As the voltage output by generator device 714 increases and becomes greater than the rectified AC voltage output by bridge rectifier 704, electric motor 712 utilizes the power provided by generator device 714. As this happens, power supply 702 and rectifier 704 operate similarly to that of a no-load scenario. Additionally, rectifier 704 provides isolation between generator device 714 and power supply 702. As the voltage output of generator device 714 falls below that of the AC rectified voltage, electric motor 712 draws its operating power from power supply 702. Rectifier 722 provides isolation for generator device 714 from the voltage and current being output from bridge rectifier 704. In this manner, electric motor 712 may operate using renewable energy from generator device 714, when available, and may use a conventional power supply (i.e., power supply 702) when renewable energy is insufficient.

The embodiments described herein provide systems and methods for controlling power to an electric motor. The embodiments facilitate regenerating energy for use directly by an electric motor, rather than reconditioning it for regeneration back to a power line, resulting in increased system efficiency and a reduction in components. The systems use already existing components of an electric motor, which reduces cost of production and increases reliability of the systems. Using a single controller to control both operation of the electric motor and the generation device enables additional redundant components to be removed, resulting in additional cost savings. The control system can be used for new manufacture of motors or for integration with existing motors. Further, the embodiments enable full control of generator operating point for regulation of energy flow.

A technical effect of the system described herein includes at least one of: (a) coupling a filter capacitor between a rectifier and an electric motor, wherein the filter capacitor is configured to smooth a DC voltage rectified by the rectifier; (b) coupling a generator device across the filter capacitor; (c) extracting power from the generator device; and (d) powering the electric motor at least in part using the extracted voltage.

Exemplary embodiments of the control system and methods of controlling power to the electric motor are described above in detail. The control system and methods are not limited to the specific embodiments described herein, but rather, components of the control system and/or the motor and/or steps of the method may be utilized independently and separately from other components and/or steps described herein. For example, the control system and methods may also be used in combination with other power systems and methods, and are not limited to practice with only the HVAC system as described herein. Rather, the exemplary embodiments can be implemented and utilized in connection with many other system applications or other support.

In operation, the system is configured according to the user's requirements. The system may be configured as any of the following non-exclusive circuits alone or in combination, for example, a power supply regulating circuit, an electromagnetic interference filter, a speed modulator, a torque modulator, a transient suppression circuit, an active power factor correction circuit, a passive power factor correction circuit and a process parameter control circuit.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An energy recovery system for use in a refrigeration system, the refrigeration system comprising an evaporator, a compressor and a condenser, the refrigeration system being configured to circulate refrigerant along a flow path such that the refrigerant flows from the evaporator to the compressor, and from the compressor to the condenser, and from the condenser to the evaporator, at least one of the evaporator, compressor and condenser including an electric motor, the energy recovery system comprising:
    a turbine-generator expansion valve adapted and configured to be in the flow path operatively between the condenser and the evaporator and to expand refrigerant, the turbine-generator expansion valve being configured to convert mechanical energy generated during expansion of refrigerant in the refrigeration system into electrical energy; and
    a circuit configured to apply electrical energy generated by the turbine-generator expansion valve to the electric motor to at least partially power the electric motor, wherein the circuit comprises a rectifier configured to rectify a voltage output of the turbine generator expansion valve, and a DC link from which the electric motor draws power, wherein the circuit is configured to directly provide the rectified voltage to the DC link, wherein the circuit is configured to directly provide the rectified voltage to the DC link.

2. The system of claim 1 wherein the circuit is further configured to apply electrical energy from a power source to the electric motor to at least partially power the electric motor, the circuit further comprising a second rectifier configured to rectify a voltage output of the power source, and wherein the circuit is configured to directly provide the rectified voltage output of the power source to the DC link.

3. The system of claim 2 wherein the circuit further comprises an inverter in circuit between the DC link and the electric motor.

4. An energy recovery system for use in a refrigeration system, the refrigeration system comprising an evaporator, a compressor and a condenser, the refrigeration system being configured to circulate refrigerant along a flow path such that the refrigerant flows from the evaporator to the compressor, and from the compressor to the condenser, and from the condenser to the evaporator, at least one of the evaporator, compressor and condenser including an electric motor, the energy recovery system comprising:
    a turbine-generator expansion valve adapted and configured to be in the flow path operatively between the condenser and the evaporator and to expand refrigerant, the turbine-generator expansion valve being configured to convert mechanical energy generated during expansion of refrigerant in the refrigeration system into electrical energy;
    a circuit configured to apply electrical energy generated by the turbine-generator expansion valve to the electric motor to at least partially power the electric motor, wherein the circuit comprises a capacitor, wherein the circuit is further configured to store at least a portion of the electrical energy in the capacitor, and wherein the capacitor is configured to provide stored electrical energy to the electric motor; and
    wherein the circuit further comprises an inverter, the inverter comprising an inverter input and an inverter output, and wherein the inverter input is coupled to an output of the turbine-generator expansion valve, wherein the inverter output is coupled across the capacitor, and wherein the inverter is configured to condition the electrical energy generated by the turbine-generator expansion valve for storage in the capacitor.

* * * * *